US012639227B2

(12) United States Patent
Chuang et al.

(10) Patent No.: US 12,639,227 B2
(45) Date of Patent: May 26, 2026

(54) TRANSACTION METHOD AND TRANSACTION SYSTEM CAPABLE OF REDUCING DYNAMIC RANDOM-ACCESS MEMORY TRAFFIC

(71) Applicant: MEDIATEK INC., Hsin-Chu (TW)

(72) Inventors: Ying-Chou Chuang, Hsinchu City (TW); Tung-Hai Wu, Hsinchu City (TW); Chih-Hsien Lin, Hsinchu City (TW); Wen-Wei Chao, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/677,864

(22) Filed: May 29, 2024

(65) Prior Publication Data

US 2025/0370934 A1     Dec. 4, 2025

(51) Int. Cl.
*G06F 12/0891* (2016.01)
*G06F 12/0846* (2016.01)
*G06F 13/16* (2006.01)

(52) U.S. Cl.
CPC ...... *G06F 12/0891* (2013.01); *G06F 12/0848* (2013.01); *G06F 13/1673* (2013.01)

(58) Field of Classification Search
None
See application file for complete search history.

(56) References Cited

U.S. PATENT DOCUMENTS

| | | | |
|---|---|---|---|
| 8,493,397 B1* | 7/2013 | Su | H04N 19/61 |
| | | | 345/530 |
| 10,936,500 B1* | 3/2021 | Inna | G06F 12/0891 |
| 2018/0181491 A1* | 6/2018 | DeLaurier | G06F 12/084 |
| 2018/0336138 A1* | 11/2018 | Simionescu | G06F 12/0868 |
| 2020/0110708 A1* | 4/2020 | Ma | G06F 12/0246 |
| 2020/0175646 A1* | 6/2020 | Boyd | G06F 12/0846 |
| 2022/0138010 A1* | 5/2022 | Nigro | G06F 9/4806 |
| | | | 718/104 |
| 2023/0214330 A1* | 7/2023 | Nandu | G06F 12/127 |
| | | | 711/133 |
| 2024/0362164 A1* | 10/2024 | Chung | G06F 12/0215 |

* cited by examiner

*Primary Examiner* — Yaima Rigol
(74) *Attorney, Agent, or Firm* — Winston Hsu

(57) ABSTRACT

A transaction method includes initializing a first read counter according to a first predefined read count by a microcontroller unit (MCU), writing data to a cache by a first processing element, reading the data from the cache by a second processing element, transmitting a first read done message from the second processing element to the MCU after the data of the cache is read by the second processing element, decrementing the first read counter according to the first read done message by the MCU, and transmitting a first frame-discard cache maintenance operations (CMO) command from the MCU to the cache when the first read counter is decremented to zero.

20 Claims, 8 Drawing Sheets

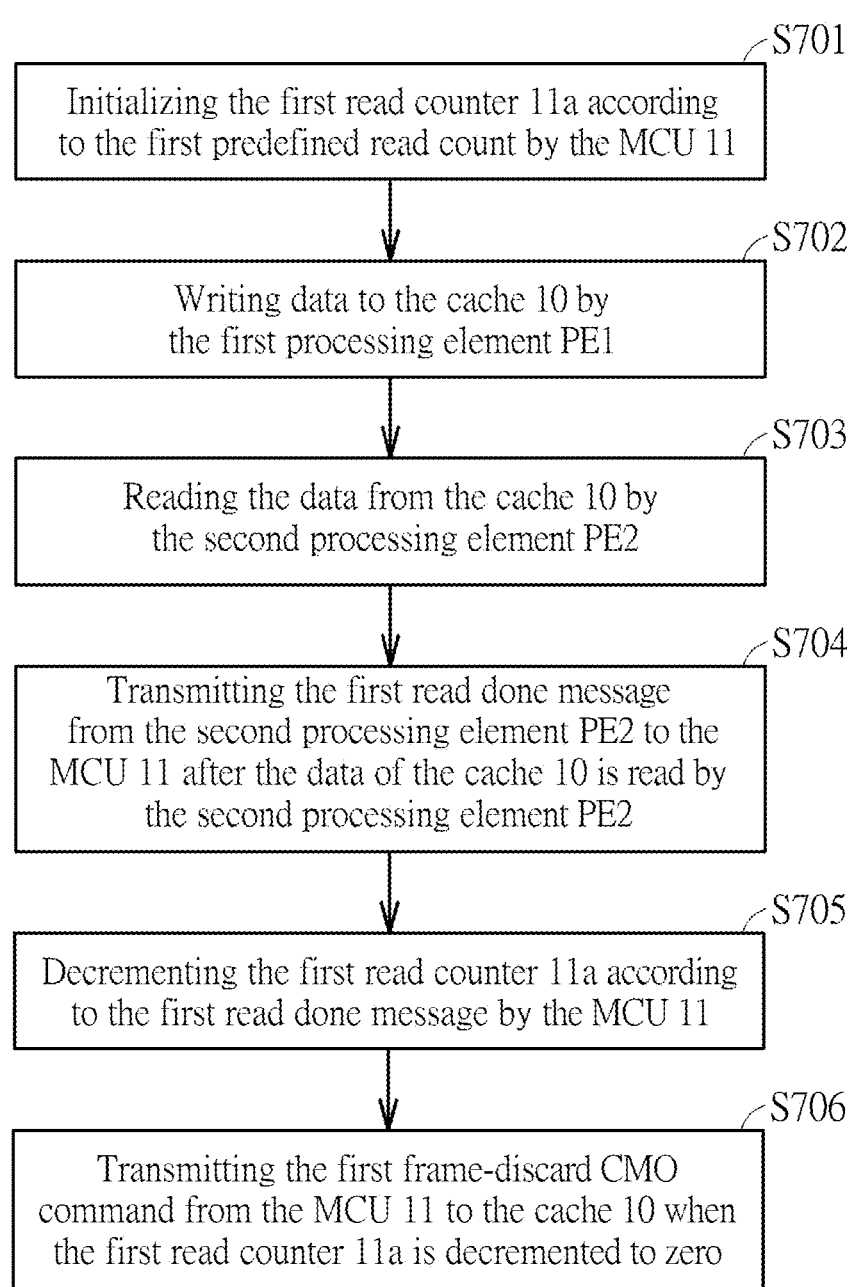

S701

Initializing the first read counter 11a according
to the first predefined read count by the MCU 11

S702

Writing data to the cache 10 by
the first processing element PE1

S703

Reading the data from the cache 10 by
the second processing element PE2

S704

Transmitting the first read done message
from the second processing element PE2 to the
MCU 11 after the data of the cache 10 is read by
the second processing element PE2

S705

Decrementing the first read counter 11a according
to the first read done message by the MCU 11

S706

Transmitting the first frame-discard CMO
command from the MCU 11 to the cache 10 when
the first read counter 11a is decremented to zero

FIG. 7

TRANSACTION METHOD AND TRANSACTION SYSTEM CAPABLE OF REDUCING DYNAMIC RANDOM-ACCESS MEMORY TRAFFIC

BACKGROUND

In multimedia applications, many periodic data streams (such as image frame data) can use buffers for performing data transfer among processing elements (PEs). Typically, the data transfer can be implemented by using a dynamic random-access memory (DRAM) for saving local buffers at the expense of additional DRAM bandwidth. Currently, a cache memory can be introduced for saving partial DRAM bandwidth.

However, although the cache memory can reduce the DRAM read bandwidth, data is eventually written back to the DRAM. Therefore, the DRAM write bandwidth cannot be saved. In addition, although dram write-back bandwidth can be saved by adding cache invalidation operations after the last read of cache data is completed, when the data of the cache is written once and read many times, the read order cannot be fixed. Additionally, when the reading address space and the writing address space in the cache are not directly correlated in a one-to-one mapping, the data in the cache cannot be fully cleared. As a result, this situation may lead to a reduction in transaction efficiency.

Therefore, developing a transaction system for saving the DRAM bandwidth and improving the transaction efficiency is an important issue.

SUMMARY

In an embodiment of the present invention, a transaction method is disclosed. The transaction method comprises initializing a first read counter according to a first predefined read count by a microcontroller unit (MCU), writing data to a cache by a first processing element, reading the data from the cache by a second processing element, transmitting a first read done message from the second processing element to the MCU after the data of the cache is read by the second processing element, decrementing the first read counter according to the first read done message by the MCU, and transmitting a first frame-discard cache maintenance operations (CMO) command from the MCU to the cache when the first read counter is decremented to zero.

In another embodiment of the present invention, a transaction system is disclosed. The transaction system includes a first processing element, a second processing element, a cache coupled to the first processing element and the second processing element, and a microcontroller unit (MCU) coupled to the first processing element, the second processing element, and the cache. The MCU initializes a first read counter of the MCU according to a first predefined read count. The first processing element writes data to the cache. The second processing element reads the data from the cache. The second processing element transmits a first read done message to the MCU after the data of the cache is read by the second processing element. The MCU decrements the first read counter according to the first read done message. The MCU transmits a first frame-discard cache maintenance operations (CMO) command to the cache when the first read counter is decremented to zero.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a flow chart of performing a transaction method by the transaction system in FIG. 1.

DETAILED DESCRIPTION

Figure 1:
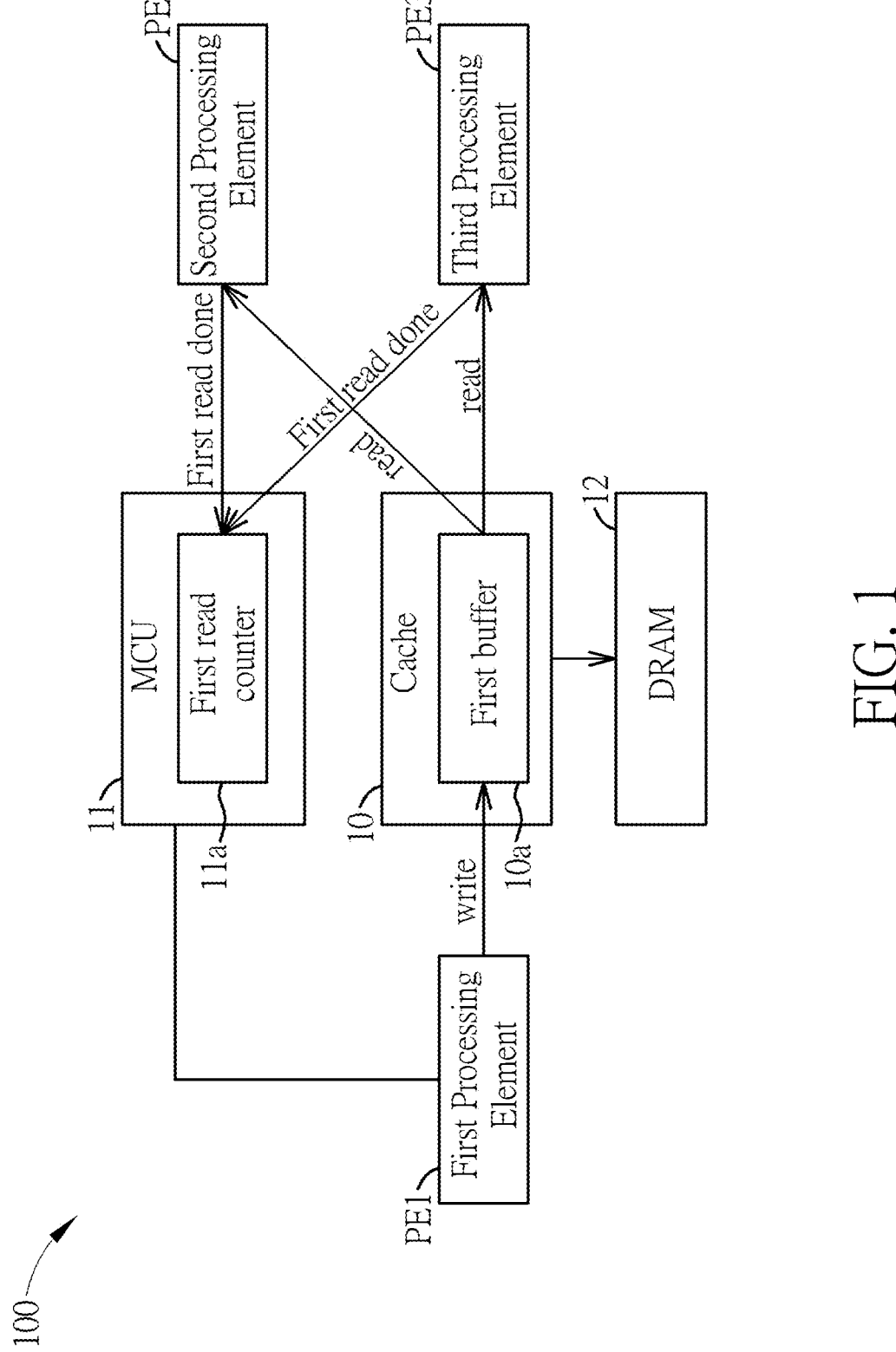
FIG. 1 is a block diagram of a transaction system according to a first embodiment of the present invention.
Figure 2:
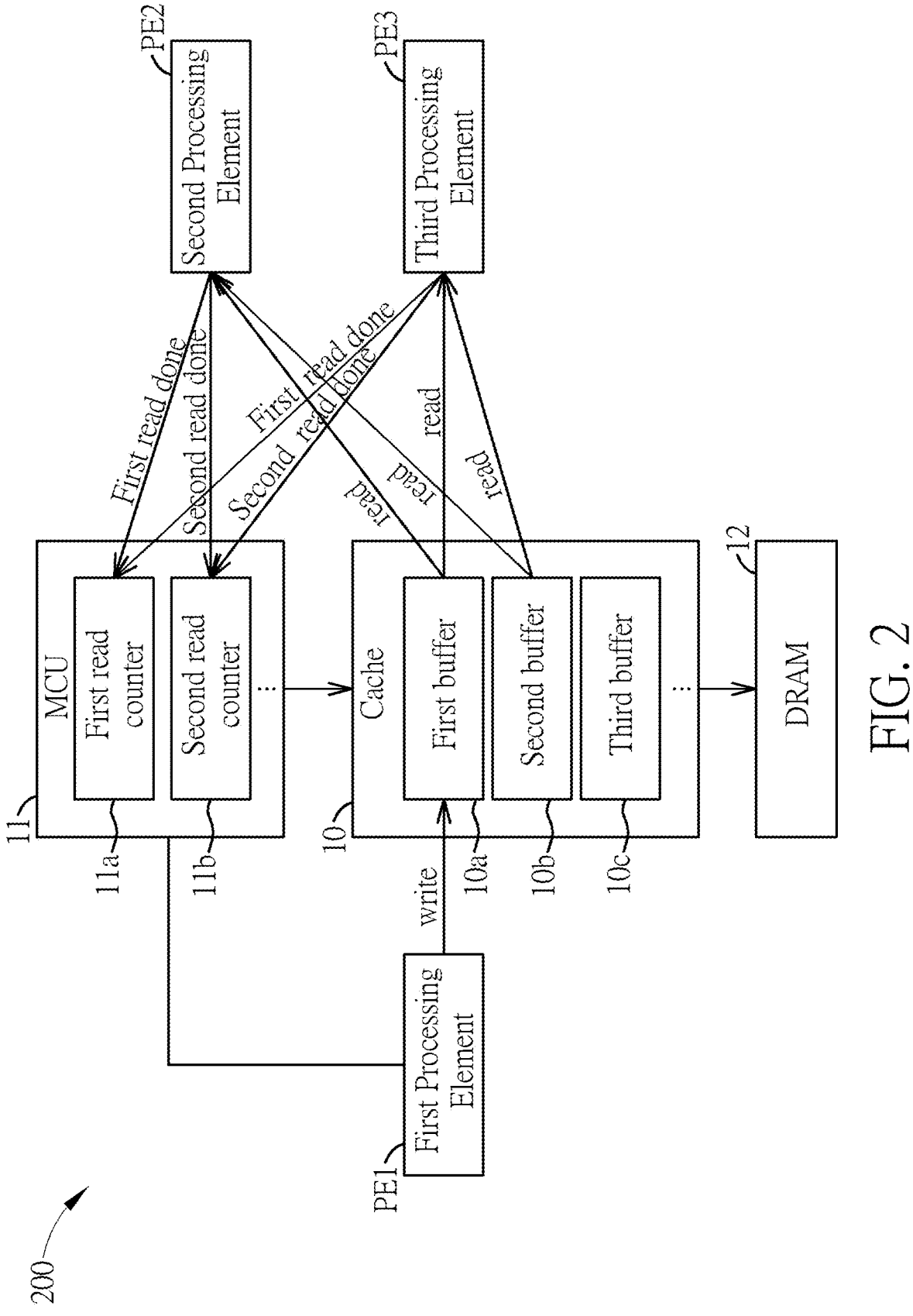
FIG. 2 is an illustration of introducing a plurality of buffers and a plurality of read counters to the transaction system in FIG. 1.

FIG. 1 is a block diagram of a transaction system 100 according to a first embodiment of the present invention. The transaction system 100 includes a first processing element PE1, a second processing element PE2, a third processing element PE3, a cache 10, and a microcontroller unit (MCU) 11. The first processing element PE1, the second processing element PE2, and the third processing element PE3 can be different function modules. The cache 10 is coupled to the first processing element PE1, the second processing element PE2, and the third processing element PE3. Here, the cache 10 can include at least one buffer, such as a first buffer 10a. The first processing element PE1 can include a Write Direct Memory Access (WDMA) engine of a transaction producer for writing data to the first buffer 10a. The second processing element PE2 and the third processing element PE3 can include a Read Direct Memory Access (RDMA) engine of a transaction consumer for reading data from the first buffer 10a. The MCU 11 is coupled to the first processing element PE1, the second processing element PE2, the third processing element PE3, and the cache 10. The MCU 11 includes at least one read counter, such as a first read counter 11a. In the transaction system 100, the MCU 11 can initialize the first read counter 11a of the MCU 11 according to a first predefined read count. Here, the first predefined read count is equal to a total read count of the first buffer 10a read by the second processing element PE2 and the third processing element PE3. The MCU 11 can trigger the first processing element PE1 to write data to the first buffer 10a of the cache 10 through the WDMA engine. The MCU 11 can trigger the second processing element PE2 and the third processing element PE3 to read data from the first buffer 10a of the cache 10 through the RDMA engine. Then, the second processing element PE2 and the third processing element PE3 can transmit first read done messages to the MCU 11 after each time the first buffer 10a is read by the second processing element PE2 or the third processing element PE3. Then, the MCU 11 decrements the first read counter 11a according to the first read done messages. Thereafter, the MCU 11 can transmit a first frame-discard cache maintenance operation (CMO) command to the cache 10 when the first read counter 11a is decremented to zero. The first buffer 10a of the cache 10 is invalidated when the cache 10 receives the first frame-discard CMO command. Further, the transaction system 100 can include a dynamic random-access memory (DRAM) 12. The DRAM 12 is coupled to the cache 10 for assisting data transactions. For example, when the cache 10 is insufficient for buffering large data, the DRAM 12 can be used for accessing data. The aforementioned embodiment can be regarded as a frame discard mechanism. By using the frame discard mechanism, the DRAM bandwidth utilization of the first processing element PE1, the second processing element PE2, and the third processing element PE3 can be reduced. In the embodiment, the cache 10 is a physical hardware component. The cache 10 can be virtually partitioned into at least one buffer, such as the first buffer 10a, a second buffer 10b, and a third buffer 10c (as shown in FIG. 2). The first buffer 10a corresponds to first buffer identifier (BID) information. The second buffer 10b corresponds to second BID information, and so on. Details of the frame discard mechanism are illustrated later.

FIG. 2 is an illustration of introducing a plurality of buffers and a plurality of read counters to the transaction system 100. For avoiding ambiguity, the transaction system having the plurality of buffers and the plurality of read counters is called as a transaction system 200 hereafter. In FIG. 2, the cache 10 of the transaction system 200 can include the first buffer 10a, a second buffer 10b, and a third buffer 10c, etc. The MCU 11 of the transaction system 200 can include the first read counter 11a, a second read counter 11b, etc. In the embodiment, the MCU 11 can assign first buffer identifier (BID) information to the first processing element PE1, the second processing element PE2, and the third processing element PE3. Here, the first BID information can include an index of the first buffer 10a. The first processing element PE1 can attach a first sideband signal with the first BID information to the cache 10 for indicating the first buffer 10a being written by the first processing element PE1 through the WDMA engine. Further, the first read done messages generated from the second processing element PE2 and the third processing element PE3 can append with the first BID information. Similarly, the first BID information can be added to the first frame-discard CMO command. The MCU 11 can transmit the first frame-discard CMO command having the first BID information to the cache 10 when the first read counter 11a is decremented to zero.

In the embodiment, a BID field can be added to each cache line in the cache 10 for pointing at least one cache line to the first buffer 10a. For example, the BID field can be added in Table T1, as shown below.

TABLE T1

| Cache line index address | Valid | Tag | Dirty | BID | Data |
|---|---|---|---|---|---|
| 0 | | | | A | |
| 1 | | | | A | |
| 2 | | | | A | |
| . | | | | | |
| . | | | | | |
| . | | | | | |
| N | | | | | |

Here, the first BID information with index "A" is used for pointing cache lines with index 0~2 to the first buffer 11a. In other words, the cache 10 including N cache lines can be virtually partitioned into at least one buffer according to the BID information. Further, in the transaction system 200, after the cache 10 receives the first frame-discard CMO command having the first BID information, the cache 10 can identify the first BID information appended in the first frame-discard CMO command. Specifically, when the frame-discard CMO command is accepted and the first BID information is identified, all cache lines corresponding to the first BID information in the BID field can be invalidated. In other words, the lifetime of the first buffer 10a is defined as a time point of writing the first data to the first buffer 10a by using the WDMA engine to a time point of reading the last data from the first buffer 10a by using the RDMA engine.

Similarly, the MCU 11 can assign second BID information to the first processing element PE1, the second processing element PE2, and the third processing element PE3. The MCU 11 can initialize a second read counter 11b of the MCU 11 according to a second predefined read count. The second predefined read count is equal to a total read count of the second buffer 10b read by the second processing element PE2 and the third processing element PE3. Then, the MCU 11 can trigger the first processing element PE1 to write data to the second buffer 10b of the cache 10. The first processing element PE1 attaches a second sideband signal with the second BID information to the cache 10 for indicating the second buffer 10b being written by the first processing element PE1. The MCU 11 can trigger the second processing element PE2 and the third processing element PE3 to read data from the second buffer 10b of the cache 10. Here, the second processing element PE2 and the third processing element PE3 can transmit second read done messages having the second BID information to the MCU 11 after the second buffer 10b is read by the second processing element PE2 or the third processing element PE3. Then, the MCU 11 decrements the second read counter 11b according to the second read done messages. Thereafter, the MCU 11 can transmit a second frame-discard CMO command having the second BID information to the cache 10 when the second read counter 11b is decremented to zero. The BID field is added to each cache line in the cache for pointing at least one cache line to the second buffer 10b. The second BID information includes an index of the second buffer 10b. The second buffer 10b of the cache 10 is invalidated when the cache 10 receives the second frame-discard CMO command having the second BID information. Details of invalidating the first buffer 10a or the second buffer 10b in the cache 10 are illustrated below.

Figure 3A:
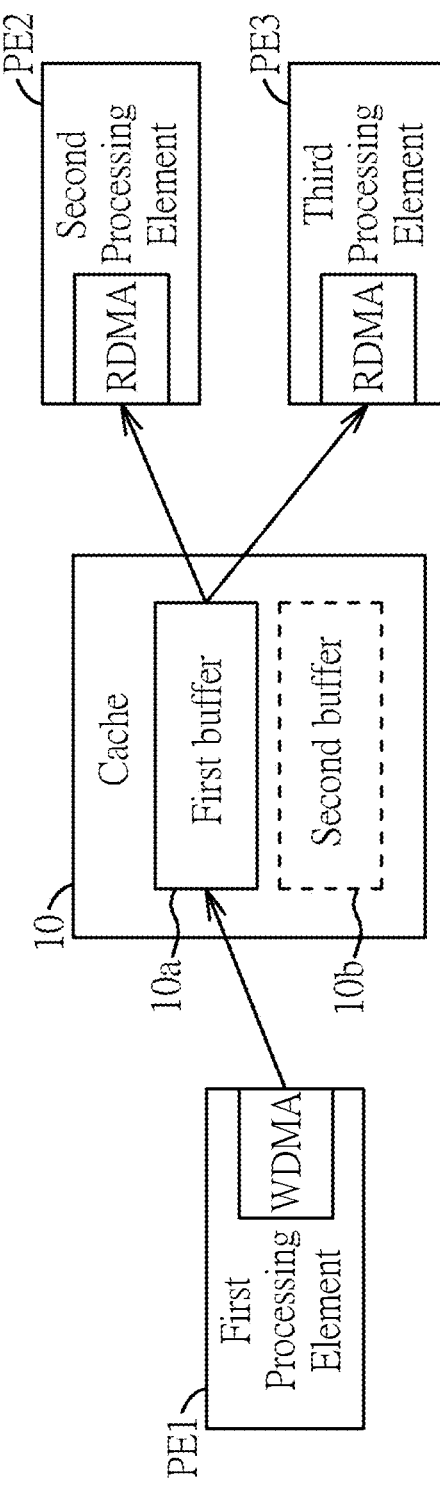
FIG. 3A is an illustration of a mechanism of Ping-Pong buffers under a first frame of the transaction system in FIG. 1.
Figure 3B:
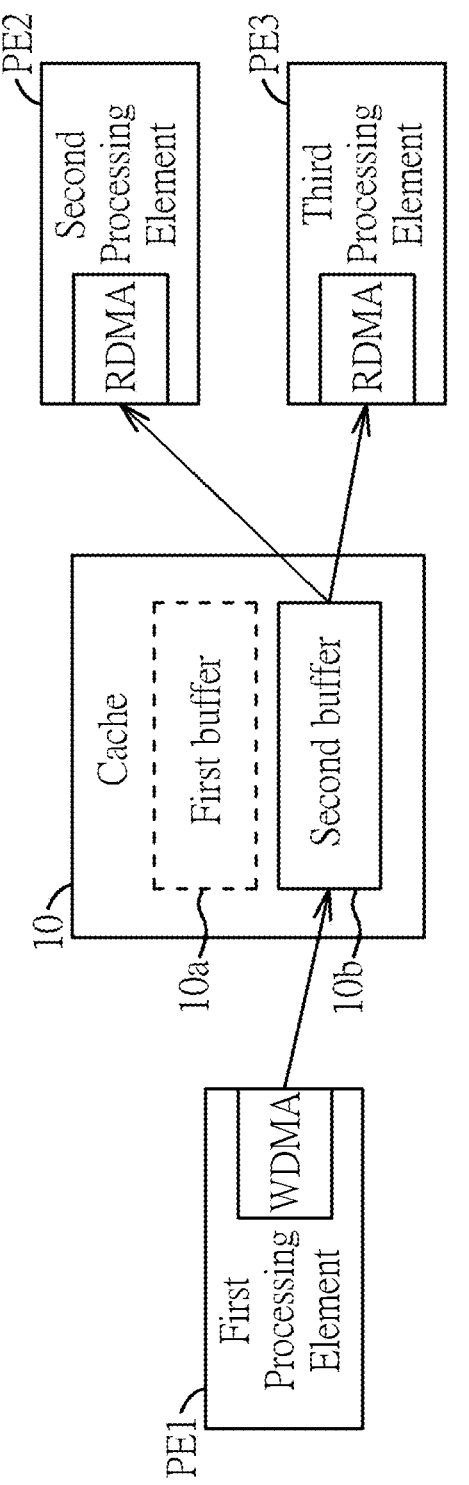
FIG. 3B is an illustration of the mechanism of the Ping-Pong buffers under a second frame of the transaction system in FIG. 1.

FIG. 3A is an illustration of a mechanism of Ping-Pong buffers under a first frame of the transaction system 100. FIG. 3B is an illustration of the mechanism of the Ping-Pong buffers under a second frame of the transaction system 100. In FIG. 3A and FIG. 3B, the first buffer 10a and the second buffer 10b are taken as an embodiment for working together. In FIG. 3A, under the first frame, the first processing element PE1 writes data to the first buffer 10a through the WDMA engine. Details of activating the first buffer 10a are illustrated below. In the transaction system 200, a cache policy table is established in the cache 10. The cache policy table can include a BID field and a discard flag field. The BID field is used for listing buffer indices of the cache 10. The discard flag field is used for listing discard flag statuses corresponding to the buffer indices. For example, a discard flag status of the first buffer 10a (i.e., with BID "A") can be cleared to zero by using a first discard flag removing CMO command CFD CMO#A. Here, CFD is an abbreviation of Clear-Frame-Discard. The first discard flag removing CMO command CFD CMO#A can include a first discard flag removing status "Discard Flag=0" and the first BID information "BID=A". Further, a discard flag status of the second buffer 10b (i.e., with BID "B") is initially set (i.e., or set in a previous frame) to one. Therefore, the cache policy table can be expressed as Table T2.

TABLE T2

| BID | Discard Flag |
| --- | --- |
| A | 0 |
| B | 1 |

For all cache lines whose BID's Discard flag cache 1 corresponds to one, these cache lines have the highest priority to be replaced. As a result, according to the cache policy table T2, under the first frame, the first buffer 10a can be enabled by replacing the second buffer 10b of the cache 10 with the first buffer 10a when the cache 10 receives the first discard flag removing CMO command CFD_CMO#A. After the first buffer 10a is enabled, the first processing element PE1 can write data to the first buffer 10a through the WDMA engine. The second processing element PE2 and the third processing element PE3 can read data from the first buffer 10a through the RDMA engine.

In FIG. 3B, under the second frame, the first processing element PE1 writes data to the second buffer 10b through the WDMA engine. Details of activating the second buffer 10b are illustrated below. Similarly, a discard flag status of the second buffer 10b (i.e., with BID "B") can be cleared to zero by using a second discard flag removing CMO command CFD_CMO#B. The second discard flag removing CMO command CFD_CMO#B can include a second discard flag removing status "Discard Flag=0" and the second BID information "BID=B". Further, a discard flag status of the first buffer 10a can be set to one by using a first discard flag setting CMO command SFD CMO#A.

Here, SFD is an abbreviation of Set-Frame-Discard. Therefore, the cache policy table can be expressed as Table T3.

TABLE T3

| BID | Discard Flag |
| --- | --- |
| A | 1 |
| B | 0 |

Similarly, according to the cache policy table T3, under the second frame, the second buffer 10b can be enabled by replacing the first buffer 10a of the cache 10 with the second buffer 10b when the cache 10 receives the second discard flag removing CMO command CFD_CMO#B. After the second buffer 10b is enabled, the first processing element PE1 can write data to the second buffer 10b through the WDMA engine. The second processing element PE1 and the third processing element PE1 can read data from the second buffer 10b through the RDMA engine. In other words, when a lifetime of the first buffer 10a ends, the discard flag of the first buffer 10a can be set as "discard flag=1" by using the first discard flag setting CMO command SFD CMO#A. Further, before the lifetime of the first buffer 10a begins, the discard flag of the first buffer 10a can be cleared as "discard flag=0" by using the first discard flag removing CMO command CFD_CMO#A. In FIG. 3A and FIG. 3B, the second buffer 10b is invalidated during the life cycle of the first buffer 10a. The first buffer 10a is invalidated during the lifetime of the second buffer 10b. Here, the first buffer and the second buffer should be considered as logical buffers and they can share the same physical cache size.

In the transaction system 100 or 200, a BID mapping table can be introduced to the MCU 11. The BID mapping table can be expressed as Table T4.

TABLE T4

| BID | predefined read count | read counter |
| --- | --- | --- |
| 0 | 0 | 0 |
| . | 0 | 0 |
| . | | |
| . | | |
| A | 2 | 0 |
| B | 2 | 0 |
| . | 0 | 0 |
| . | | |
| . | | |
| N | 0 | 0 |

Here, each WDMA can be assigned equal to or more than two unique BIDs. Then, the MCU 11 can set a mapping correlation of the BID and the predefined read count to different buffers having different BIDs. Before the WDMA engine is triggered, the MCU can send the X-th discard flag removing CMO command CFD_CMO#X to the cache 10. Then, the MCU 11 can reload X-th read counter from X-th predefined read count. Once the MCU 11 receives the X-th read done messages, the MCU 11 decrements the X-th read counter. When the X-th read counter is decremented to zero, the MCU 11 sends the X-th discard flag setting CMO command SFD CMO#X to the cache 10. However, in another embodiment, the flag removing CMO command is not essential for the frame discard mechanism. For example, when the cache 10 is able to automatically scan the cache lines for invalidating the X-th buffer, the discard flag of the X-th buffer can be automatically cleared by the cache 10. Details of various frame discard mechanisms of the transaction system 100 or 200 are illustrated below.

Figure 4:
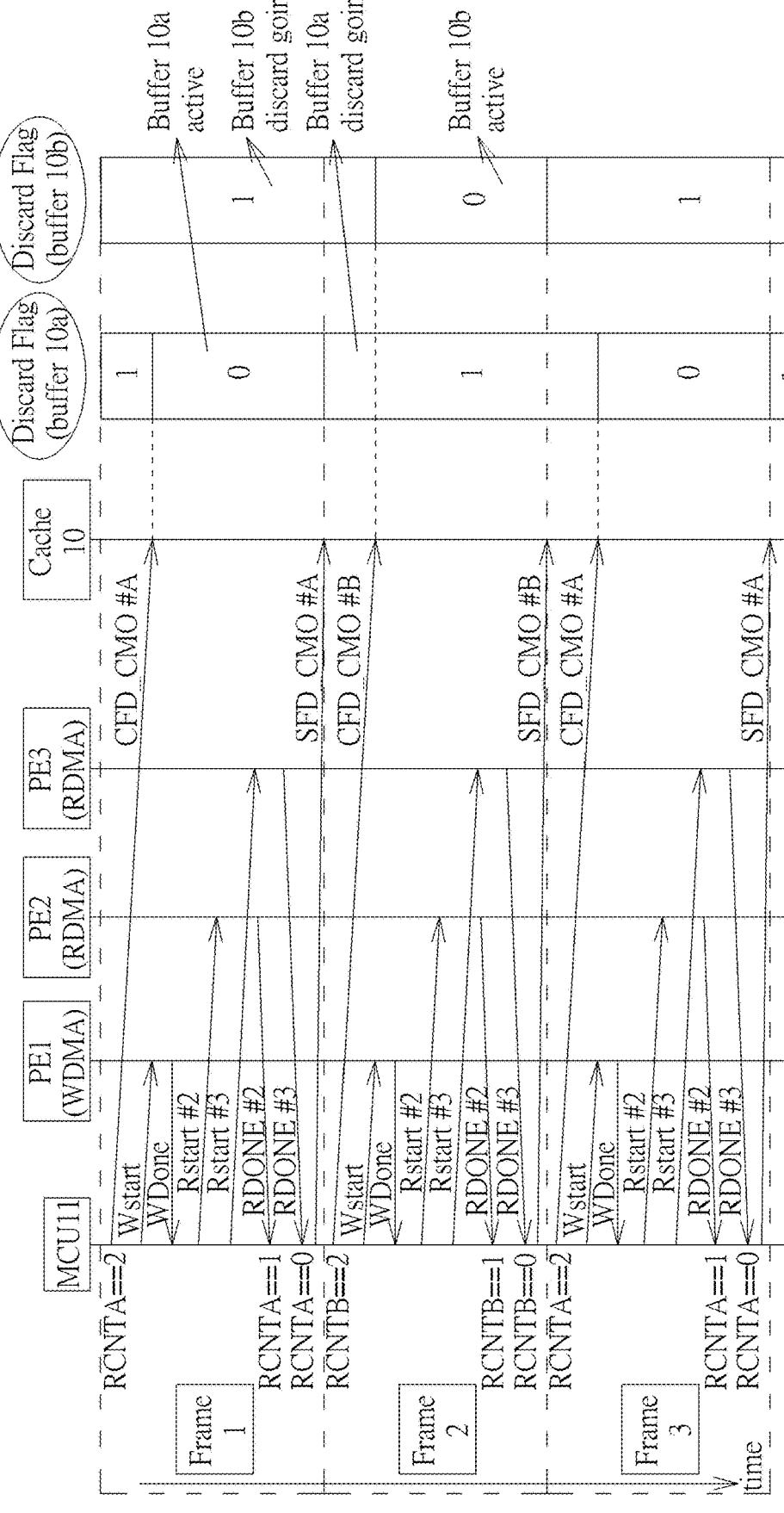
FIG. 4 is signal flows of controlling a cache under a first mode of the transaction system in FIG. 1.

FIG. 4 is signal flows of controlling the cache 10 under a first mode of the transaction system 100 or 200. For simplicity, the MCU 11, the first processing element PE1, the second processing element PE2, the third processing element PE3, the cache 10, the first buffer 10a, and the second buffer 10b are introduced in FIG. 4. In a first frame, the MCU 11 initializes the first read counter 11a as the first predefined read count RCNTA=2. Then, the MCU 11 sends the first discard flag removing CMO command CFD_CMO#A to the cache 10. The first discard flag of the first buffer 10a is removed to zero. The first buffer 10a is activated by replacing the second buffer 10b of the cache 10 with the first buffer 10a. After the second buffer 10b is replaced, the second buffer 10b is invalidated. Then, the MCU 11 triggers the first processing element PE1 to write data to the first buffer 10a through the WDMA engine. The MCU 11 further triggers the second processing element PE2 and the third processing element PE3 to read data from the first buffer 10a. After the first buffer 10a is read by the second processing element PE2 or the third processing element PE3, the second processing element PE2 and the third processing element PE3 transmit the first read done messages (i.e., RDONE#2 and RDONE#3) to the MCU 11. Here, the MCU 11 can decrement the first read counter 11a according to the first read done messages. For example, after the MCU 11 receives the read done message RDONE#2, the first read counter 11a is changed from RCNTA=2 to RCNTA=1. Then, after the MCU 11 receives the read done message RDONE#3, the first read counter 11a is changed from RCNTA=1 to RCNTA=0. When the first read counter 11a is decremented to zero, the MCU 11 can send the first discard flag setting CMO command SFD CMO#A to the cache 10. The first discard flag setting CMO command SFD CMO#A can include a first discard flag setting status "Discard Flag=1" and the first BID information "BID=A".

In a second frame, the MCU 11 initializes the second read counter 11b as the second predefined read count RCNTB=2. Then, the MCU 11 sends the second discard flag removing CMO command CFD_CMO#B to the cache 10 before the second buffer 10b is written by the first processing element PE1. Here, the second discard flag removing CMO command CFD_CMO#B includes a second discard flag removing status "Discard Flag=0" and second BID information "BID=B". The second discard flag of the second buffer 10b is removed to zero. The second buffer 10b is activated by replacing the first buffer 10a of the cache 10 with the second buffer 10b. After the first buffer 10a is replaced, the first buffer 10a is invalidated. Then, the MCU 11 triggers the first processing element PE1 to write data to the second buffer 10b through the WDMA engine. The MCU 11 further triggers the second processing element PE2 and the third processing element PE3 to read data from the second buffer 10b. After the second buffer 10b is read by the second processing element PE2 or the third processing element PE3, the second processing element PE2 and the third processing element PE3 transmit the second read done messages (i.e., RDONE#2 and RDONE#3) to the MCU 11. Here, the MCU 11 can decrement the second read counter 11b according to the second read done messages. For example, after the MCU 11 receives the read done message RDONE#2, the second read counter 11b is changed from RCNTB=2 to RCNTB=1. Then, after the MCU 11 receives the read done message RDONE#3, the second read counter 11b is changed from RCNTB=1 to RCNTB=0. When the second read counter 11b is decremented to zero, the MCU 11 can send the second discard flag setting CMO command SFD CMO#B to the cache 10. The second discard flag setting CMO command SFD CMO#B can include a second discard flag setting status "Discard Flag=1" and the second BID information "BID=B". The signal flows in a third frame is similar to the signal flows in a first frame. Thus, details are omitted here. The First mode hides the cache invalidation time.

Figure 5:
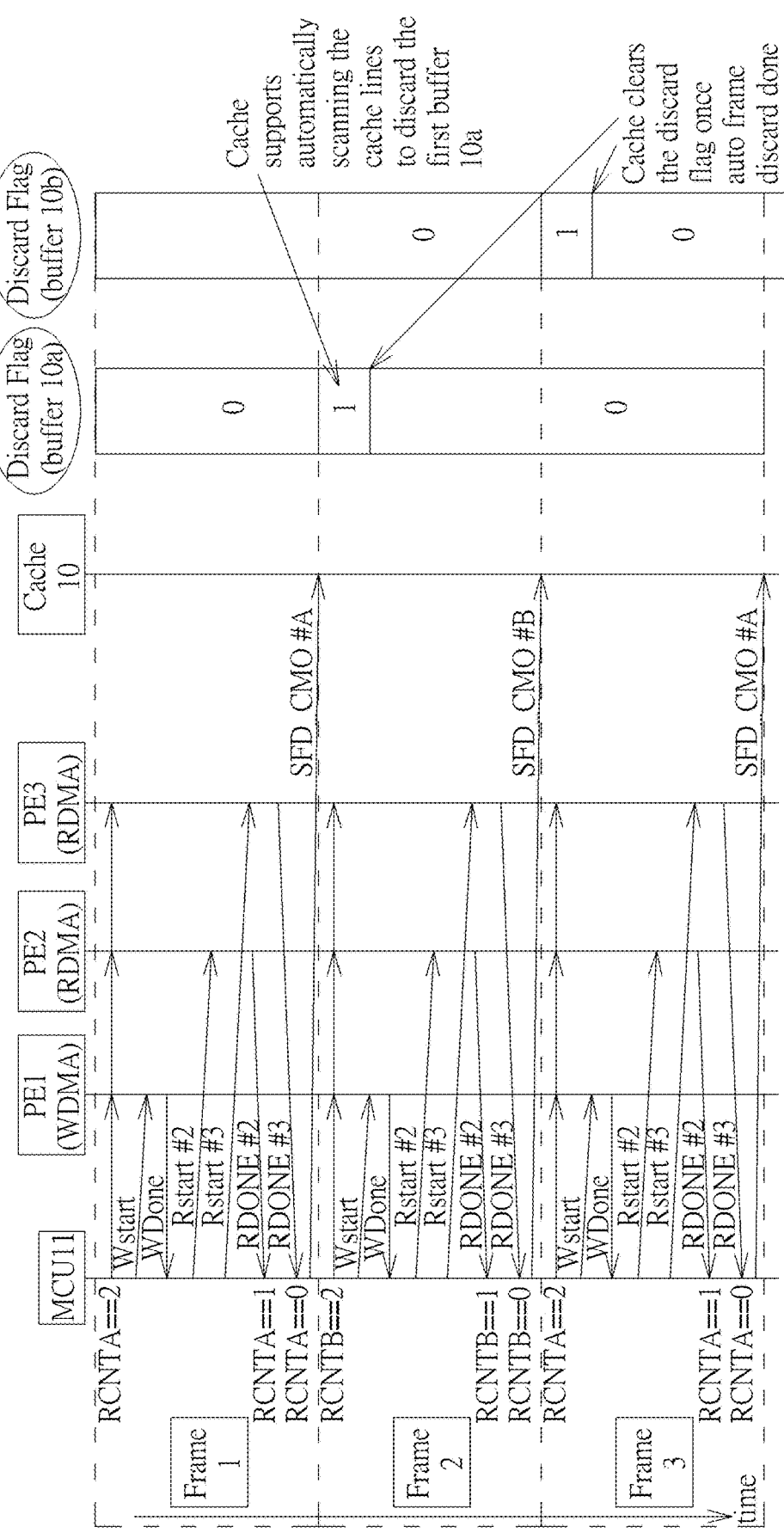
FIG. 5 is signal flows of controlling a cache under a second mode of the transaction system in FIG. 1.

FIG. 5 is signal flows of controlling the cache 10 under a second mode of the transaction system 100 or 200. In FIG. 5, in the first frame, the MCU 11 can transmit the first discard flag setting CMO command SFD CMO#A to the cache 10 after the first read done messages (RDONE#2 and RDONE#3) are received by the MCU 10. Similarly, the first discard flag setting CMO command SFD CMO#A includes a first discard flag setting status "Discard Flag=1" and the first BID information "BID=A". Then, in the second frame, the cache 10 can automatically scan at least one cache line corresponding to the first buffer 10a for invalidating the first buffer 10a. Then, the cache 10 can automatically set a first discard flag having the first flag removing status "Discard Flag=0" of the first buffer 10a after the first buffer 10a is invalidated. In other words, the cache 10 can clear the first discard flag of the first buffer 10a when the automatic frame discard process is performed. Similarly, in the second frame, the MCU 11 can send the second discard flag setting CMO command SFD CMO#B to the cache 10 after the second read done messages (RDONE#2 and RDONE#3) are received by the MCU 10. The second discard flag setting CMO command SFD CMO#B includes the second flag setting status "Discard Flag=1" and the second BID information "BID=B". The cache 10 can automatically scan at least one cache line corresponding to the second buffer 10b for invalidating the second buffer 10b. The cache 10 can automatically set a second discard flag having a second flag removing status "Discard Flag=0" of the second buffer 10b after the second buffer 10b is invalidated. In other words, the cache 10 can clear the second discard flag of the second buffer 10b when the automatic frame discard process is performed.

Figure 6:
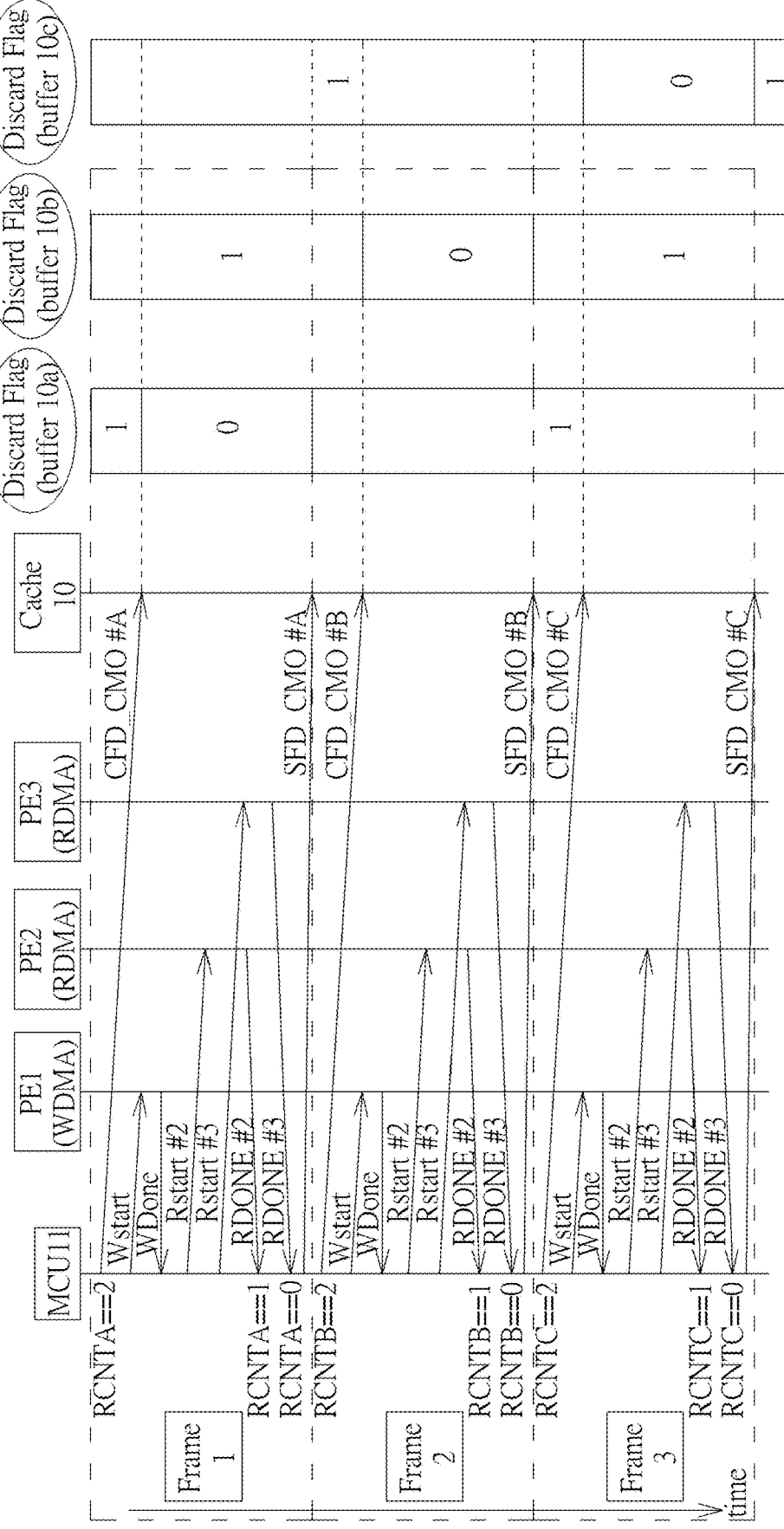
FIG. 6 is signal flows of controlling a cache under a third mode of the transaction system in FIG. 1.

FIG. 6 is signal flows of controlling the cache 10 under a third mode of the transaction system 100 or 200. In FIG. 6, a plurality buffers can be introduced, such as the first buffer 10a, the second buffer 10b, and the third buffer 10c. Here, when a lifetime of an X-th buffer ends, the discard flag of the X-th buffer can be set as "Discard Flag=1" by using an X-th discard flag setting CMO command SFD CMO#X. Further, before the lifetime of the X buffer begins, the discard flag of the X-th buffer can be cleared as "Discard Flag=0" by using an X-th discard flag removing CMO command CFD_CMO#X. For example, in the third frame, the MCU 10 can transmit a third discard flag removing CMO command CFD_CMO#C to the cache 10 before the third buffer 10c is written by the first processing element PE1. The third discard flag removing CMO command CFD_CMO#C includes a third discard flag removing status "Discard Flag=0" and third BID information "BID=C". The MCU 11 can transmit a third discard flag setting CMO command SFD CMO#C to the cache 10 after third read done messages are received by the MCU 11. Here, the third discard flag setting CMO command SFD CMO#C includes a third discard flag setting status "Discard Flag=1" and the third BID information "BID=C". As a result, the third buffer 10c of the cache 10 is activated after the third discard flag removing CMO command CFD_CMO#C is received by the cache 10. The third buffer 10c of the cache 10 is invalidated after the third flag setting CMO command SFD CMO#C is received by the cache 10. The third mode can be used to provide more time for cache invalidation than the first mode.

FIG. 7 is a flow chart of performing a transaction method by the transaction system 100. The transaction method includes step S701 to step S706. Any reasonable technology or hardware modification falls into the scope of the present invention. Step S701 to step S706 are illustrated below.

step S701: initializing the first read counter 11a according to the first predefined read count by the MCU 11;

step S702: writing data to the cache 10 by the first processing element PE1;

step S703: reading the data from the cache 10 by the second processing element PE2;

step S704: transmitting the first read done message from the second processing element PE2 to the MCU 11 after the data of the cache 10 is read by the second processing element PE2;

step S705: decrementing the first read counter 11a according to the first read done message by the MCU 11;

step S706: transmitting the first frame-discard CMO command from the MCU 11 to the cache 10 when the first read counter 11a is decremented to zero.

Details of step S701 to step S706 are previously illustrated. Thus, they are omitted here. In the transaction system 100, since the read counter and frame-discard CMO command are used, the lifetime of the buffer in the cache 10 can be controlled. Since the cache 10 can be controlled for supporting the WDMA engine of the transaction producer and the RDMA engine of the transaction consumer, the bandwidth utilization of the DRAM can be minimized.

To sum up, the present invention discloses a transaction method and a transaction system. The transaction system uses a cache frame discard mechanism for minimizing DRAM traffic. Further, the transaction system introduces the frame-discard CMO command and the read counter for saving bandwidth of writing data for the following two cases. In a first case, the data of the cache is written once and read many times. In a second case, a reading address space and a writing address space in the cache do not have a one-to-one mapping correlation. Further, a Ping-Pong BIDs or a plurality of BIDs can be used for discarding or enabling a certain buffer of the cache by using the discard flag setting CMO command and the discard flag removing CMO command. In other embodiments, when the cache automatically scans the cache lines to discard the certain buffer, the discard flag removing CMO command can be omitted. The lifetime of the buffer in the cache can be controlled. As a result, since the cache can be controlled for supporting the WDMA engine of the transaction producer and the RDMA engine of the transaction consumer, the bandwidth utilization of the DRAM can be minimized. The embodiments disclosed in this invention can be applied to, but not limited to, the image signal processing device or the multimedia device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transaction method comprising:
assigning first buffer identifier (BID) information to a first processing element and a second processing element;
initializing a first read counter according to a first predefined read count by a microcontroller unit (MCU);
writing data to a cache by the first processing element;
attaching a first sideband signal with the first BID information;
reading the data from the cache by the second processing element;
appending the first BID information with a first read done message;
transmitting the first read done message from the second processing element to the MCU after the data of the cache is read by the second processing element;
decrementing the first read counter according to the first read done message by the MCU; and
transmitting a first frame-discard cache maintenance operations (CMO) command from the MCU to the cache in response to decrementing the first read counter to zero.

2. The method of claim 1, further comprising:
invalidating the cache in response to the cache receiving the first frame-discard CMO command.

3. The method of claim 1, further comprising:
adding the first BID information to the first frame-discard CMO command; and
adding a BID field to each cache line in the cache.

4. The method of claim 3, further comprising:
identifying the first BID information appended in the first frame-discard CMO command by the cache;
wherein invalidating the cache in response to the cache receiving the first frame-discard CMO command comprises invalidating all cache lines corresponding to the first BID information in the BID field in response to the first BID information being identified.

5. The method of claim 1, wherein the cache is virtually partitioned into a first buffer and a second buffer, the first buffer corresponds to first buffer identifier (BID) information, and the second buffer corresponds to second BID information.

6. The method of claim 5, further comprising:
transmitting a first discard flag removing CMO command from the MCU to the cache before the first buffer is written by the first processing element, wherein the first discard flag removing CMO command comprises a first discard flag removing status and first BID information;
enabling the first buffer by replacing the second buffer of the cache with the first buffer in response to the cache receiving the first discard flag removing CMO command;
wherein after the second buffer is replaced, the second buffer is invalidated.

7. The method of claim 6, further comprising:
transmitting a first discard flag setting CMO command from the MCU to the cache in response to decrementing the first read counter to zero, wherein the first discard flag setting CMO command comprises a first discard flag setting status and the first BID information;
transmitting a second discard flag removing CMO command from the MCU to the cache before the second buffer is written by the first processing element, wherein the second discard flag removing CMO command comprises a second discard flag removing status and second BID information; and
enabling the second buffer by replacing the first buffer of the cache with the second buffer in response to the cache receiving the second discard flag removing CMO command;
wherein after the first buffer is replaced, the first buffer is invalidated.

8. The method of claim 5, further comprising:
establishing a cache policy table in the cache;
wherein the cache policy table comprises a BID field and a discard flag field, the BID field is used for listing buffer indices of the cache, and the discard flag field is used for listing discard flag statuses corresponding to the buffer indices.

9. The method of claim 5, further comprising:
transmitting a first discard flag setting CMO command from the MCU to the cache after the first read done message is received by the MCU, wherein the first discard flag setting CMO command comprises a first discard flag setting status and the first BID information;
automatically scanning at least one cache line corresponding to the first buffer for invalidating the first buffer; and
automatically setting a first discard flag having a first flag removing status of the first buffer after the first buffer is invalidated.

10. The method of claim 9, further comprising:
transmitting a second discard flag setting CMO command from the MCU to the cache after a second read done message is received by the MCU, wherein the second discard flag setting CMO command comprises a second flag setting status and the second BID information;
automatically scanning at least one cache line corresponding to the second buffer for invalidating the second buffer; and
automatically setting a second discard flag having a second flag removing status of the second buffer after the second buffer is invalidated.

11. A transaction system comprising:

a first processing element;

a second processing element;

a cache coupled to the first processing element and the second processing element; and a microcontroller unit (MCU) coupled to the first processing element, the second processing element, and the cache;

wherein the MCU assigns first buffer identifier (BID) information to the first processing element and the second processing element, the MCU initializes a first read counter of the MCU according to a first predefined read count, the first processing element writes data to the cache, the first processing element attaches a first sideband signal with the first BID information, the second processing element reads the data from the cache, the first BID information is appended with a first read done message, the second processing element transmits the first read done message to the MCU after the data of the cache is read by the second processing element, the MCU decrements the first read counter according to the first read done message, and the MCU transmits a first frame-discard cache maintenance operations (CMO) command to the cache in response to decrementing the first read counter to zero.

12. The system of claim 11, wherein the cache is invalidated in response to the cache receiving the first frame-discard CMO command.

13. The system of claim 11, wherein the first BID information is added to the first frame-discard CMO command, and a BID field is added to each cache line in the cache.

14. The system of claim 13, wherein the cache identifies the first BID information appended in the first frame-discard CMO command, and all cache lines corresponding to the first BID information are invalidated in response to the first BID information being identified.

15. The system of claim 11, wherein the cache is virtually partitioned into a first buffer and a second buffer, the first buffer corresponds to first buffer identifier (BID) information, and the second buffer corresponds to second BID information.

16. The system of claim 15, wherein the MCU transmits a first discard flag removing CMO command to the cache before the first buffer is written by the first processing element, the first discard flag removing CMO command comprises a first discard flag removing status and first BID information, the first buffer is enabled by replacing the second buffer of the cache with the first buffer in response to the cache receiving the first discard flag removing CMO command, and after the second buffer is replaced, the second buffer is invalidated.

17. The system of claim 16, wherein the MCU transmits a first discard flag setting CMO command to the cache in response to decrementing the first read counter to zero, the first discard flag setting CMO command comprises a first discard flag setting status and the first BID information, the MCU transmits a second discard flag removing CMO command to the cache before the second buffer is written by the first processing element, the second discard flag removing CMO command comprises a second discard flag removing status and second BID information, the second buffer is enabled by replacing the first buffer of the cache with the second buffer in response to the cache receiving the second discard flag removing CMO command, and after the first buffer is replaced, the first buffer is invalidated.

18. The system of claim 15, wherein a cache policy table is established in the cache, the cache policy table comprises a BID field and a discard flag field, the BID field is used for listing buffer indices of the cache, and the discard flag field is used for listing discard flag statuses corresponding to the buffer indices.

19. The system of claim 15, wherein the MCU transmits a first discard flag setting CMO command to the cache after the first read done message is received by the MCU, the first discard flag setting CMO command comprises a first discard flag setting status and the first BID information, at least one cache line corresponding to the first buffer is automatically scanned for invalidating the first buffer, and a first discard flag having a first flag removing status of the first buffer is automatically set after the first buffer is invalidated.

20. The system of claim 19, wherein the MCU transmits a second discard flag setting CMO command to the cache after a second read done message is received by the MCU, the second discard flag setting CMO command comprises a second flag setting status and the second BID information, at least one cache line corresponding to the second buffer is automatically scanned for invalidating the second buffer, and a second discard flag having a second flag removing status of the second buffer is automatically set after the second buffer is invalidated.

* * * * *